Patented Nov. 21, 1933

1,935,890

UNITED STATES PATENT OFFICE 1,935,890

METHOD OF PRODUCING INFANTS' FOODS

Lazar Rosenthal, Brooklyn, N. Y., assignor to Mead Johnson & Company, Evansville, Ind., a corporation of Indiana No Drawing. Application June 16, 1931
Serial No. 544,925

8 Claims. (Cl. 99—11)

This invention relates to food products and more particularly to food products suitable for infants.

The main object of the invention is to produce a food product which is substantially free from egg proteins and capable of destroying air bacteria and of preventing the invasion of air bacteria in the intestinal canal of an infant consuming the food.

My invention is the result of experiments conducted for the purpose of determining the differences between the intestinal flora of breast fed and artificially fed infants. I discovered the presence of a lytic factor in nursling's stool (not found in the stool of artificially fed infants) which has a marked resistance against various physical and chemical agents.

Differences in the intestinal flora of breast fed and artificially fed infants were known prior to my experiments but attempts to explain them had failed. While it was known that human milk in contradistinction to cows' and other animals' milk contains lysozyme, it was not recognized, before my discovery, that lysozyme is the lytic factor to which is attributable the stability of the gram positive bifidus flora of the nursling's stool, free from invasion of air bacteria.

Thus I established that lysozyme, which from a calories viewpoint has no nutritive value, plays a very important part in the development of the intestinal flora of nurslings.

The problem was how to impart to artificially fed infants the benefits of lysozyme. The use of eggs which constitutes a common source of supply of lysozyme as a rule is avoided in infants' diet in the first year of life. See the following authorities:

Thursfield & Paterson, Diseases of Children, Arnold—London, 1929, page 69.

Holt & Rowland, The Diseases of Infancy and Childhood, Appleton, 1922, page 197 and Appleton, 1931, page 152.

Finkelstein, Lehrbuch der Säuglings—Krankheiten, Berlin, Springer, 1924, page 75.

Besides, the boiling and frying of eggs destroys the lysozyme and raw eggs are even more objectionable in infants' diet than are boiled eggs Lysozyme was by various methods separated from the proteins of the egg white and obtained in a watery solution to which I shall hereinafter refer as isolated lysozyme. Prior to my invention the isolated lysozyme was not used in any food product. The isolated lysozyme is unstable and when kept under not strictly sterile conditions can be easily deteriorated by some moulds which are resistant to the action of lysozyme. In using lysozyme, substantially free from protein, as a component part of a food product, I was confronted with the problem of maintaining the activity and stability of the product without using preservatives unsuitable for infants' diet.

I found that lysozyme, in combination with a sugary substance or in a sugary solution, does not deteriorate, due probably to the preservative power of the sugar, and remains active and has good keeping qualities. On the other hand sugar exposed to air can be contaminated by certain air bacteria, but such contamination can be prevented by the addition of lysozyme. In this way lysozyme and sugar cooperate with each other to maintain the combined product in active condition less apt to be contaminated.

Furthermore, I have discovered that milk powder containing lysozyme is more "bacteria-proof" than is milk powder without lysozyme.

To extract lysozyme from egg white, I preferably proceed as follows:

1. A watery solution, usually five parts of white of egg to a 100 parts of water with or without addition of salt, is prepared although, it is to be understood that other proportions can be employed, within the province of the invention according to the results desired. As an alternative, dried powder of white of egg diluted in water can also be used.

2. To this white of egg solution, a substantial amount or equal volume of cream of aluminum hydroxide is added and the mixture is thoroughly commingled.

3. The mixture is freed from the precipitated proteins preferably by centrifugation. The resulting supernatant liquid extract is clear, transparent, colorless and tasteless and is practically free from proteins and aluminum and contains lysozyme in large amounts.

Having obtained a lysozyme solution I may determine its lysozyme content by adding a turbid suspension of a strain of sarcina isolated from the air. Under the influence of lysozyme the turbid suspension in a short time clarifies and becomes transparent and the bacteria are dissolved.

The liquid extract containing lysozyme may be added in suitable proportions to any animal milk, usually to cow's milk, and the resulting mixture may be used in liquid form. Or the mixture may be dried or converted into a powder in the usual way. Since lysozyme is not active in an acid medium, it is advisable to neutralize the milk, if it is acid, best by addition of calcium carbonate and subsequent removal of this substance by centrifugation. My experiments have shown that lysozyme remains active in dried milk powder and does not deteriorate after the powder is diluted with water for infant feeding.

Furthermore, the liquid extract containing lysozyme may be added to a suitable solution of various sugars such as, dextrose, lactose, maltose etc. Or alternatively, the various sugars may be dissolved in the lysozyme liquid extract. This mixture of lycozyme and sugar may be used per se for infant feeding in liquid form or may be dried or converted into powder which subsequently may be added to milk, water etc. My experiments have further disclosed that lysozyme does not deteriorate in such mixtures with sugars.

The liquid extract of lysozyme can be combined with any milk products or other food products such as cereals, juices of fruits, tomatoes, syrups, confectionery and the like.

While I prefer, in preparing my new food product, to combine the lysozyme with some form of sugar, I do not intend to limit the invention to such combination.

Many modifications of my invention will be apparent to those skilled in the art without departing therefrom or from the scope of the claims, and since the aforegoing disclosure has been given by way of example for clearness and understanding only, no unnecessary limitations should be understood and the appended claims should be construed as broadly as the state of the art permits.

I claim:

1. As a new article of manufacture, cereals containing lysozyme substantially free from protein.
2. As a new article of manufacture, juices of fruits with a lysozyme content substantially free from protein.
3. As a new article of manufacture, a food product suitable for infant feeding, comprising lysozyme substantially free from protein, and a substance normally free from lysozyme.
4. As a new article of manufacture, a food product suitable for infant feeding, comprising lysozyme substantially free from protein, and a saccharide normally free from lysozyme.
5. The method of preparing a food product suitable for infant feeding, which consists in adding lysozyme, substantially free from protein, to an edible substance normally free from lysozyme.
6. A new article of manufacture comprising milk naturally deficient in lysozyme and containing added lysozyme substantially free from proteins.
7. As a new article of manufacture, a concentrated food product for infant feeding, substantially free from proteins, containing lysozyme.
8. A stabilized lysozyme preparation substantially free from proteins and capable of destroying and retarding development of air bacteria in the intestinal canal of infants, said preparation having the lysozyme incorporated in powdered milk employed for infant feeding.

LAZAR ROSENTHAL.